United States Patent
Blue et al.

(10) Patent No.: US 9,626,235 B2
(45) Date of Patent: *Apr. 18, 2017

(54) MANAGING QUEUES IN AN ASYNCHRONOUS MESSAGING SYSTEM

(75) Inventors: George Meldrum Blue, Southampton (GB); Nigel Goddard, Eastleigh (GB); Martin James Gompertz, Hampshire (GB); Andrew Ian Hickson, West Wellow (GB); Gary Patrick Longerstaey, Winchester (GB); Philip Graham Willoughby, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,641

(22) Filed: Jun. 29, 2012

(65) Prior Publication Data

US 2012/0272248 A1 Oct. 25, 2012

Related U.S. Application Data

(63) Continuation of application No. 12/576,161, filed on Oct. 8, 2009, now Pat. No. 8,276,160.

(30) Foreign Application Priority Data

Oct. 10, 2008 (EP) .................................... 08166354

(51) Int. Cl.
*G06F 3/00* (2006.01)
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS

| | | | |
|---|---|---|---|
| 5,452,430 A * | 9/1995 | Dievendorff et al. | 714/37 |
| 5,548,760 A | 8/1996 | Healey | |
| 7,606,867 B1 * | 10/2009 | Singhal et al. | 709/209 |
| 2004/0133680 A1 | 7/2004 | Sorrentino | |

(Continued)

FOREIGN PATENT DOCUMENTS

| | | |
|---|---|---|
| TW | 200307875 | 12/2003 |
| TW | I243996 | 11/2005 |

(Continued)

*Primary Examiner* — Sisley Kim
(74) *Attorney, Agent, or Firm* — Steven L. Nichols; Fabian VanCott

(57) ABSTRACT

A method of managing an asynchronous messaging queue with a client computer in an asynchronous messaging system, where the client computer is programmed to store an manage the asynchronous messaging queue, includes receiving a reactive message in the asynchronous messaging queue, the reactive message including an identification of a previously initiated message and an action to be performed on the previously initiated message; and upon determining that the previously initiated message has already been received in the asynchronous messaging queue, performing the action on the previously initiated message with the client computer.

17 Claims, 3 Drawing Sheets

(56) References Cited

U.S. PATENT DOCUMENTS

2004/0224706 A1* 11/2004 Lorello et al. .............. 455/466
2005/0004496 A1   1/2005 Pilu et al.
2005/0004996 A1* 1/2005 Nagai et al. ................ 709/219
2008/0196039 A1* 8/2008 Garrard et al. ............. 719/314

FOREIGN PATENT DOCUMENTS

TW   I259370       8/2006
WO   2004010284 A  1/2004

\* cited by examiner

MANAGING QUEUES IN AN ASYNCHRONOUS MESSAGING SYSTEM

CROSS-REFERENCE TO RELATED APPLICATIONS

The present application is a continuation of and claims priority under 35 U.S.C. §120 from, U.S. patent application Ser. No. 12/576,161, filed Oct. 8, 2009, now allowed, which in turn, claims priority pursuant to 35 U.S.C. §119(a) from Great Britain Patent Application No. 08166354.4, which was filed on Oct. 10, 2008. All related application noted here are incorporated herein by reference in their respective entireties.

BACKGROUND

Aspects of the present invention relate in general to message oriented middleware (MOM), and more particularly to managing queues in a data processing system employing asynchronous messaging.

In recent years, the ability of application programs to communicate with each other or with system provided services in a computer system or network without having to become involved in the complexities of particular operating systems or communication protocols has been much enhanced by the development of Message Oriented Middleware (MOM). This is software providing a common programming interface by means of which applications can communicate with other applications without specific knowledge of the different operating systems and/or protocols which may be used by those applications.

One example of Message Oriented Middleware is the IBM WebSphere MQ product family ("IBM" and "WebSphere" are trademarks of International Business Machines Corporation). A comprehensive description of one of these products is contained in the book "WebSphere MQ V6 Fundamentals" (SG 24-7128, November 2005), also available via the Internet.

WebSphere MQ and other MOM products employ message queuing which allows programs to send and receive application specific data to each other without having a private, dedicated logical connection established between them. Instead, messages containing the application specific data are placed on queues by a queue manager local to the application. These queues may be accessed directly by applications on the same system using the same queue manager or their contents may be transmitted over a network or multi node system and placed on respective associated queues accessible to a receiving application via its respective local queue manager. In order to transmit messages to remote applications, the originating queue manager must first establish a communication channel to the remote queue manager. Both transmission and accessing of queued messages take place asynchronously.

Applications communicate with their associated queue managers via a standard application programming interface (API), known as the Message Queuing Interface (MQI) in the case of WebSphere MQ. Specific API commands cause the queue manager to store (PUT) messages on named destination queues, either directly, if local, or by transmitting them to the appropriate queue manager at a node elsewhere in the system and also to retrieve (GET) stored messages from such queues. A queue can be both a source of messages and a destination for messages.

In a large data processing system having multiple processor nodes or a heterogeneous network of different processors, some of which may be physically remote from each other, there may be a queue manager at each node. In this case, each queue manager must be aware of or capable of discovering the location of all the others in the network or system and be capable of determining whether it owns the destination queue for a received message or, if not, how to send it on towards a destination queue on another queue manager.

Currently, if incorrect, faulty or incomplete data has been sent in the application data part of a message, for example a faulty order form, it will still be retrieved and processed by the application owning the destination queue. If the message contains built in exception/error handling procedures, the receiving application may be able to inform the source application or to take a user exit. It is also possible that, if the data in the source application message was entered by a human user, that user may recognise and wish to correct the message data content. Such situations are currently remedied by sending further messages to correct or change the actions already taken by the receiving application.

However, this inevitably causes delay as time is wasted in that the receiving application has to process both the faulty and the compensating or correcting message.

BRIEF SUMMARY

A method of managing an asynchronous messaging queue with a client computer in an asynchronous messaging system, where the client computer is programmed to store an manage the asynchronous messaging queue, includes receiving a reactive message in the asynchronous messaging queue, the reactive message including an identification of a previously initiated message and an action to be performed on the previously initiated message; and upon determining that the previously initiated message has already been received in the asynchronous messaging queue, performing the action on the previously initiated message with the client computer An asynchronous messaging system node includes a processor and computer memory communicatively coupled to and readable by the processor. The computer memory is configured to store an asynchronous messaging queue and software, such that the processor, when executing the software, is configured to: receive a reactive message in the asynchronous messaging queue, the reactive message including an identification of a previously initiated message and an action to be performed on the previously initiated message; search the asynchronous messaging queue to determine whether the previously initiated message has already been received in the asynchronous messaging queue; and responsive to determining that the previously initiated message has already been received in the asynchronous messaging queue, perform the action on the previously initiated message.

A computer program product for managing an asynchronous messaging queue includes a computer readable storage medium having computer readable program code embodied therewith, the computer readable program code having: computer readable program code configured to receive a reactive message in the asynchronous messaging queue, the reactive message comprising an identification of a previously initiated message and an action to be performed on the previously initiated message; and computer readable program code configured to perform the action on the previously initiated message responsive to a determination that the previously initiated message has already been received in the asynchronous messaging queue.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
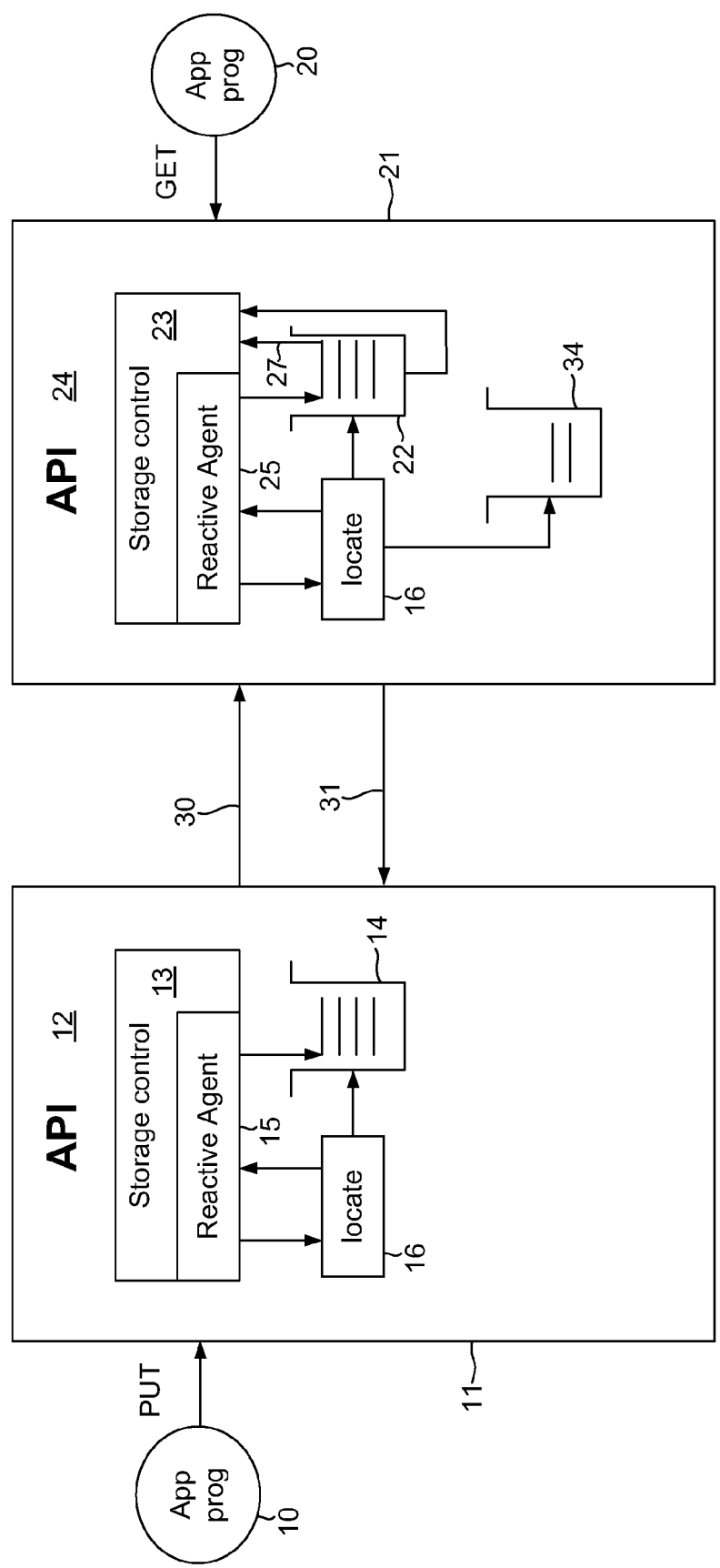
FIG. 1 is a schematic diagram of an illustrative system employing two queue managers, each capable of handling reactive messages according to one exemplary embodiment of the principles described herein.

The present specification discloses a method of managing an asynchronous messaging queue with a client computer in an asynchronous messaging system, where the client computer is programmed to store and manage the asynchronous messaging queue. The message includes receiving a reactive message in the asynchronous messaging queue, the reactive message including an identification of a previously initiated message and an action to be performed on the previously initiated message; and upon determining that the previously initiated message has already been received in the asynchronous messaging queue, performing the action on the previously initiated message with the client computer As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The system of FIG. 1 is a simple example of an asynchronous messaging system for allowing application programs, resident on two different nodes of a data processing network and potentially running on different operating systems and using different communications protocols, to communicate with each other using message oriented middleware. It should be realised that the application of such middleware and of the present invention is not restricted to this two node example. For instance, there may be many more nodes in the network, with messages being routed from source to destination nodes across the network as necessary. Also, the communication technique may be employed between applications resident on a single processor node, even though, in that case there should be no problems of compatibility.

The conventional aspects of the system of FIG. 1 will first be described. Two application programs, 10 and 20 are resident on respective nodes comprised by queue managers 11 and 21. It is assumed that application program 10 wishes to send a message to application program 20 by means of the message queuing system provided by the two queue managers.

In order to do this, the application program 10 makes a PUT call to queue manager 11 via an Application Programming Interface (API) 12. The PUT call includes the message concerned and identifies its destination on a target queue 22, maintained by queue manager 21. Conventionally, this message will pass through a storage control portion 13 of queue manager 11 and, as the target queue is not local to this queue manager, will be placed on a transmission queue 14 associated with queue manager 21 for onward transmission to queue manager 21.

A communication channel 30 includes send and receive message channel agents (not separately illustrated) at each queue manager and using an appropriate communication protocol is established between the two queue managers. At a time determined by a trigger event in queue manager 11, which may, for example, be immediate or may be when a certain number of messages have been accumulated for the target queue, the message or messages on the transmission queue are passed to queue manager 21 by the message channel agents forming channel 30. The actual message transport mechanism is transparent to the application.

A storage control portion 23 of queue manager 21 then places the message or messages on the target queue 22. A trigger event, such as a user input or a predetermined reaction to the arrival of one or a fixed number of messages, causes application program 20 to issue a GET call to the API layer 24 of queue manager 21. This results in the message data being delivered to application program 20 for further processing. In a similar manner, application program 20 may send a response message back to application program 10 over a return channel 31, also consisting of send and receive message channel agents (not shown).

In conventional systems, queue managers never interfere with the data content of a message, except to perform predetermined tasks like data format conversion automatically which do not change the inherent value or meaning associated with the message. Also, unless an error occurs, conventional systems ensure that a message, once put into the system, will reach a queue accessible to the intended target application by means of a GET call.

However, as mentioned above, circumstances will arise in which a user or an application responding to newly arising events may wish to countermand or modify a previously issued message. A simple example would be a change in a customer order. Conventionally, this can be done by sending another message to reverse or supplement the actions performed in response to the first message.

The present invention, however, takes advantage of the asynchronous nature of message queuing systems by providing a facility for sending so-called "reactive" messages which queue managers can use to locate and change earlier target messages before they have been retrieved by a GET call from an application program. Queue managers in such a system can be individually enabled to respond to reactive messages.

A reactive message is comprised of three sections:

1. A standard message header or properties included with all messages—this is used for routing and identification purposes as well as holding other common message information, as described in the above background section.

2. A reactive message indicator and properties—this identifies the message as being reactive and contains additional information required specifically for a reactive message such as the type of interaction and target message selection criteria.

3. A payload—this is input to the interaction between the target message and the reactive message (as is the payload of the target message).

A reactive message format is shown in more detail in the following table:

---

STANDARD MESSAGE PROPERTIES OR HEADER
Reactive Message indicator
Message selection criteria
Sticky/Non-sticky
Reaction type (e.g. delete, replace, report)
Report options
PAYLOAD

---

The standard message properties will contain fields such as the "reply to queue" and message expiry time which are referred to below. The purpose of the specific reactive message property fields will become clear as the description progresses.

Figure 2:
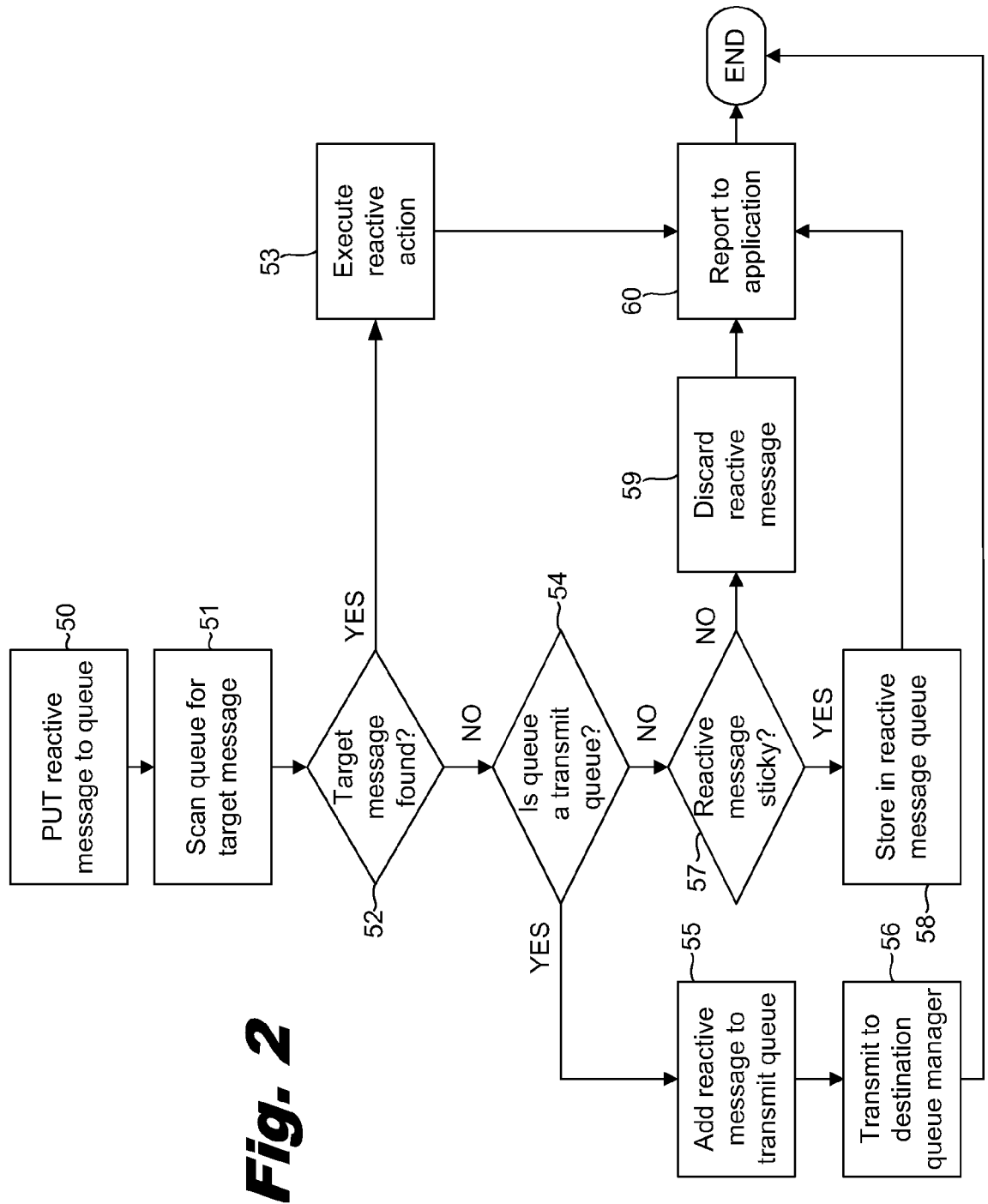
FIG. 2 is a flow diagram showing an illustrative method of processing reactive messages in a queue manager, according to one exemplary embodiment of the principles described herein.

Returning to FIG. 1, each queue manager 11 and 21 is provided with a respective reactive agent 15 and 25 to which all incoming messages are first directed. With reference also to FIG. 2, a reactive message, as described above, is generated by application program 10 and PUT, in step 50, to queue manager 11. The reactive message indicator marks the message as reactive and its properties identify the relevant target message(s) it is desired to locate. Assuming the queue manager's reactive message facility is enabled, then, as this is otherwise a standard message and PUT operation, standard queue name resolution will occur in order to determine the destination of the message. In the scenario of FIG. 1, the reactive message will be placed on the transmission queue 14 in order to follow the original message.

The transmission queue 14 is scanned by locating means 16 in step 51 for the presence of target messages, as identified by the message selection criteria in the reactive message properties. The message selection criteria used by the locating means 16 may include but are not limited to Correlation ID, Message ID, Group ID, as used in a conventional selective GET operation, or may involve more advanced methods such as Java Message Service (JMS) (Java and all Java-based trademarks and logos are trademarks of Sun Microsystems, Inc. in the United States, other countries, or both) message selectors. If the target message or messages are found on the transmit queue 14 at step 52, then remedial action is taken in step 53 before the message even reaches the target queue 22.

If, however, the target message is not found at step 52, the reaction agent checks in step 54 whether or not the queue being scanned is a transmission queue (which in the example of FIG. 1 it is). If it is, then the reactive message is added to the transmission queue 14, at step 55, since it may still catch up with the target message on queue 22. It is then transmitted to the queue manager 21 in the same way as a non-reactive message would be, as described in connection with the conventional aspects of FIG. 1.

When the reactive message is received by queue manager 21, its reactive message properties cause locating means 26 to repeat the steps of FIG. 2 on queue manager 21. Thus, the locating means scans the queue 22 for the target message, as in step 51 of FIG. 2. In this case, the target message is assumed to be found, in step 52. The locating means 26 reports this to the reactive agent 25 which then executes the specified action on the target message, in step 53. Unless it has group attributes so that it is required to act on other messages, the reactive message may then be discarded, as part of the action, as it has no further purpose.

If, however, the target message is not found in step 52 and it is confirmed in step 54 that the queue being scanned is not a transmit queue, then the reactive agent 25 determines in step 57 if the reactive message should be discarded or not, dependent on a so-called "sticky" attribute of the message. If this attribute is set, the reactive message is placed, in step 58, in a separate reactive message queue 34 which acts as a store of all reactive messages present on that queue manager. If it is not a sticky message, it is discarded at step 59. A report of the success or failure of the reactive message is then sent back to application program 10 in step 60. Success means that the necessary action has been effected (step 53) whereas steps 56 and 59 count as failure as the action has not yet been taken. It should be noted that the reactive message queue is implemented as a system queue—that is a queue created for use by the queue manager and not by an application.

The reason for having sticky messages is that, in more complex networks than FIG. 1, it is possible for messages to travel via different paths over the network and for earlier generated messages to arrive later than subsequently generated ones. It may therefore be necessary to retain a reactive message for a certain time to see if the target message arrives later on the queue. Whether a message is sticky or not depends on the nature of the data or action associated with the message. The sticky reactive message will be retained in the reactive message queue until it reaches its expiry time at which point it is discarded.

It should also be noted that a normal message may appear on a queue as a result not only of a direct PUT operation but also as the result of a rollback or an unlock operation. These are common situations where the queue manager can only take action on a target message when it becomes available for processing which may be some time after it first arrives on a queue.

Thus, another example of when it would be desirable to make a reactive message sticky could be that of message groups, members of which are locked until all are present before an application can act on them. In this case, a reactive message, such as a "delete group" action, may arrive prior to all messages in a group arriving. The message should remain, as a sticky reactive message, in order to ensure that later grouped messages are also deleted.

A further example, not shown in FIG. 2, is that operations such as PUT and GET may be transactional, that is, they may be part of a unit of work which must be completed as a whole or rolled back. As in the case of the locked group, the interaction specified in the reactive message would not be allowed. However, a sticky reactive message would be stored until the unit of work completed when the interaction would be allowed to take place.

Similar considerations apply if a message is found on a transmission queue in a transactional GET operation by the MCA. In this case, there are two possibilities:

i.) Ignore the target message—the reactive message will eventually follow the target message to its destination and react accordingly (this is likely to be the most common outcome).

ii.) If the MCA's transactional GET from the transmission queue rolls back, then allow the reaction to occur.

Although FIG. 1 shows only a pair of connected queue managers, in principle, any network where there could be more than one hop to the final destination and which would thus have multiple transmission queues would act in the same way as far as transactional GET operations are concerned.

One consequence of the possible variation in arrival times or of the target message being locked or in a unit of work and thus unavailable for reaction is that before normal messages resulting from a simple PUT call by an application program are placed on a queue, the reactive message queue 34 in the queue manager should be checked for the presence of any stored sticky reactive message which might have arrived earlier. This is described with reference to FIG. 3, in which a PUT call supplies a normal message to a queue manager at step 70. The queue manager, for example queue manager 21, FIG. 1, passes the message first to the reactive agent 25 which causes locating means 26 to determine, in steps 71, whether there are any sticky messages stored in the reactive message queue 34. If there are sticky messages in the reactive message queue, the locating means determines, in step 72, if any of them match the incoming message ID.

If there is a match, that is to say a stored sticky reactive message whose selection criteria match the incoming normal message is already in the reactive queue store, then the action associated with the reactive message is carried out, in step 74. However, if the reactive queue store is empty or any reactive messages present in the reactive store does not match the selection criteria of the incoming message, then the incoming message is placed unchanged on the queue, in step 73, completing a normal PUT operation.

The separation of steps 71 and 72 ensures that the locating means determines quickly if any sticky reactive messages are present in queue 34 prior to performing any more detailed analysis. This facilitates the administration of such messages without interfering with normal processing operations or affecting current behaviour of application programs. The queue 34 is indexed by a destination hash for quick lookups.

Possible interactions of a reactive message with its target message are:

1. Delete:

Remove the target message; sub-options would indicate whether the target message is processed in accordance with its exception report options.

2. Redirect:

Send the target message to another destination as identified in the reactive message.

3. Report Location:

Return a reply message indicating the current location of the target message.

4. OR and XOR:

Update the target message based upon the payload of the reactive message.

5. Prepend/Append:

Combine the payloads of the target message and the reactive message.

It should be noted that the reaction between the reactive and the target message occurs in the context of the reactive message. For example, to be able to use the delete action the user program generating the reactive message must be authorized to GET messages from the queue upon which the target message currently resides.

It is also desirable that the reaction between the reactive message and the target message occurs atomically with the PUT of the reactive message. Also, if the PUT was inside a syncpoint and the transaction backs out then the reaction should be reversed.

It is also preferable that rather than updating the target message in place, it is logically removed and then added back to the queue (i.e. it loses position).

One possible variant on the implementation of the invention as described above is that user defined reactions could be enabled by presenting the target message and the reactive message to a user exit at which the desired interaction could be executed.

A further possibility would be to introduce a message property to render individual messages inert to reactions.

One scenario in which the invention may be employed is a request-response time-out situation in which an application issues a request for some information for which it awaits a response e.g. a flight booking After not receiving a response for some period of time the requestor decides to abandon the request. This can be done by issuing a reactive message to delete the request message from the messaging system (the message is likely sitting at the destination having not been processed by another application) and then waiting upon the response to either the original or the reactive message.

A further scenario in which the invention might be employed is that of a large message group incorporating many messages where the entire group needs to be cancelled. An example of this might be sending a large data file that is sufficiently large that it has to be split into a number of constituent messages. The application would read a chunk of data and then send it as a message. All the messages would have the same group identifier. Near the end of the data file, it observes an error or failure with the data. As such, it wishes to cancel the entire group as it is no longer applicable.

A reactive message with the appropriate selection criteria may be sent to delete the entire group. Since all messages belonging to the group have the same group ID, this can be used to select all messages to apply the specified interaction.

Figure 3:
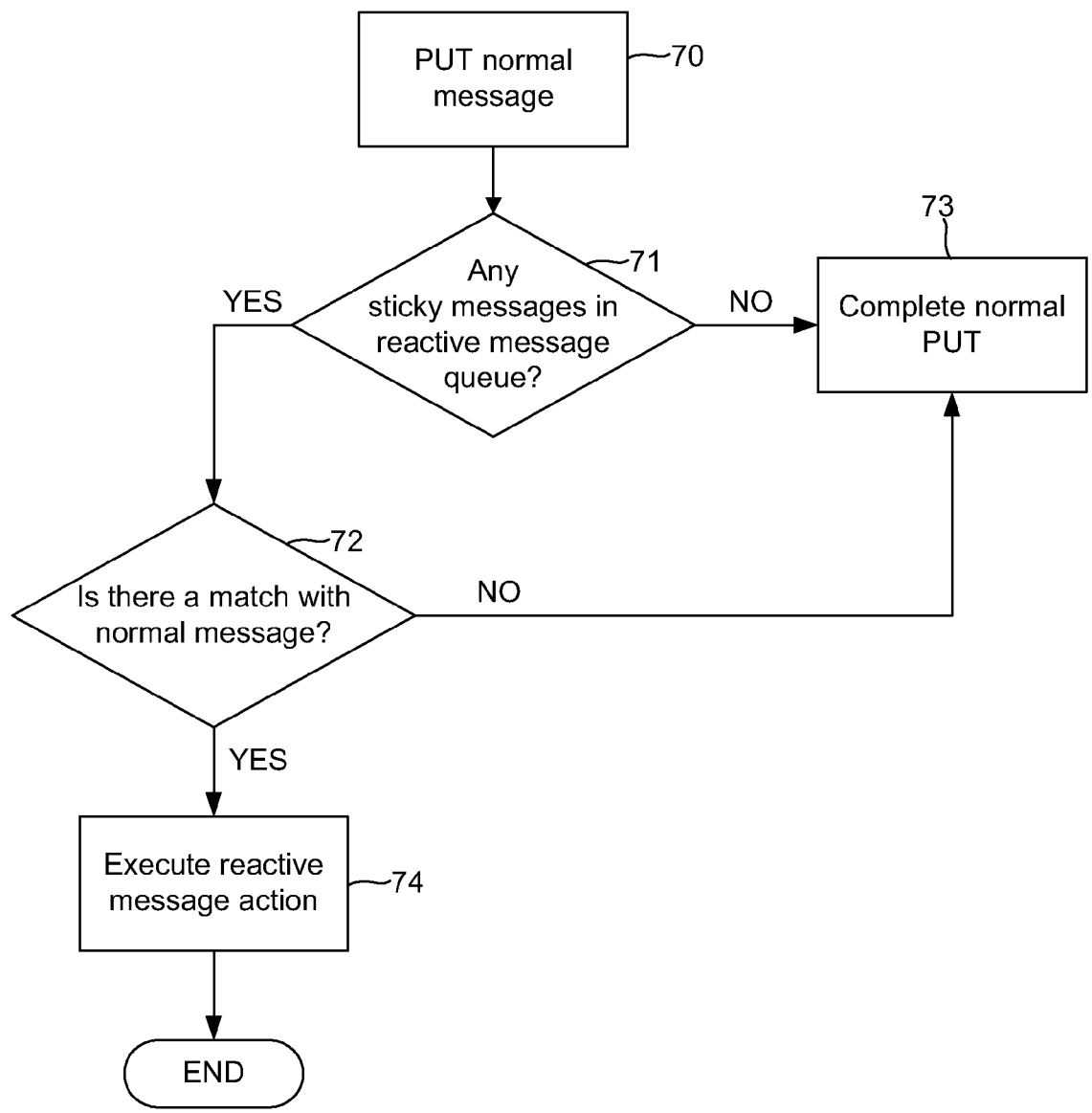
FIG. 3 is a flow diagram showing an illustrative method of processing normal messages in a queue manager, according to one exemplary embodiment of the principles described herein.

Although not illustrated in FIGS. 2 and 3, if the reactive message identifies a group of messages it would not be deleted after the defined action had taken place, as in steps 53 or 74 but would be saved and returned to the appropriate step 50, 55 in FIG. 2 or returned to the reactive message queue in FIG. 3, so as to be able to interact with successive messages in the group.

Grouped messages are typically all destined for the same instance of the target queue. Because the grouped messages are all intended to arrive at the same destination, then leaving a STICKY reactive message at that destination will result in all of the messages in the group reacting with the reactive message. In the very unusual case where messages in a group are routed through different queue managers then it would be necessary to scatter the reactive messages in the same way as for any other work load balanced destination.

The approach of scattering reactive messages to every possible destination would also work for the general case of workload balancing between different servers resulting in reactive and target messages arriving on different queue managers, albeit using the same destination queue names.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

A computer system may be used with embodiments of the present invention.

It will be appreciated that the method and arrangement described above may also suitably be carried out or partially in e.g. program code; instructions or software running on one or more processors, and that the software may be provided in the form of one or more computer program elements carried on any suitable data-carrier such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with the computer system, Such an implementation may comprise a series of computer-readable e.g. program code; instructions or software either fixed on a tangible storage medium, such as a computer readable storage medium, for example, diskette, CD-ROM, ROM, or hard disk, or transmittable to the computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of managing an asynchronous messaging queue with a client computer in an asynchronous messaging system, said client computer being programmed to store and manage said asynchronous messaging queue, said method comprising:

receiving a reactive message in said asynchronous messaging queue stored by said client computer, said reactive message comprising a reactive message indicator that the reactive message is reactive, an identification of a previously initiated message and an action to be performed on said previously initiated message;

determining whether the previously initiated message is present in the same asynchronous message queue where the reactive message has been received prior to a final delivery of the previously initiated message to an intended recipient;

responsive to a determination that said previously initiated message is present in that asynchronous messaging queue prior to the final delivery of the previously initiated message to the intended recipient, performing said action specified by the reactive message on said previously initiated message with said client computer prior to final delivery of the previously initiated message to the intended recipient;

responsive to a determination that said previously initiated message has not already been received in said asynchronous messaging queue, storing said reactive message in a reactive message store for subsequent performance of said action on said previously initiated message when said previously initiated message is subsequently available in that asynchronous messaging queue; and responsive to a determination that at least one reactive message stored in said reactive message store identifies a subsequent message received in said asynchronous messaging queue, performing an action on said subsequent message that is specified by that reactive message which identifies said subsequent message.

2. The method of claim 1, further comprising only storing said reactive message in said reactive message store if a variable attribute of said reactive message indicates that said reactive message is to be stored in said reactive message store.

3. The method of claim 1, further comprising discarding said reactive message after said action is performed on said previously initiated message.

4. The method of claim 1, in which said reactive message identifies a plurality of previously initiated messages and said action applies to each previously initiated method in said plurality, said method further comprising performing said action specified in said reactive message only after each previously initiated message identified by said reactive message has been received in said asynchronous messaging queue.

5. The method of claim 1, in which said action comprises deletion of said previously initiated message.

6. The method of claim 1, in which said action comprises modifying said previously initiated message.

7. The method of claim 1, in which said action comprises redirecting said previously initiated message to another asynchronous messaging queue.

8. The method of claim 1, in which said asynchronous messaging queue comprises a transmission queue associated with a first software entity for storing messages for onward transmission to another asynchronous messaging queue associated with a second software entity separate from said first software entity.

9. The method of claim 1, in which said asynchronous messaging queue comprises a receiving queue associated with a second software entity for receiving messages transmitted from a transmission queue associated with a first software entity.

10. An asynchronous messaging system node, said node comprising:
a processor; and
computer memory communicatively coupled to and readable by said processor, said computer memory being configured to store an asynchronous messaging queue and software, such that said processor, when executing said software, is configured to:
receive a reactive message in said asynchronous messaging queue, said reactive message comprising an identification of a previously initiated message and an action to be performed on said previously initiated message;
search said asynchronous messaging queue to determine whether said previously initiated message has already been received in said asynchronous messaging queue;
responsive to determining that said previously initiated message has already been received in said asynchronous messaging queue, perform said action on said previously initiated message prior to final delivery of the previously initiated message to an intended recipient;
responsive to a determination that said previously initiated message has not already been received in said asynchronous messaging queue, storing said reactive message in a reactive message store for subsequent performance of said action on said previously initiated message; and
responsive to a determination that at least one reactive message stored in said reactive message store identifies a subsequent message received in said asynchronous messaging queue, performing an action on said subsequent message specified by the at least one reactive message identifying said subsequent message.

11. The asynchronous messaging system node of claim 10, in which said processor is further configured to store said reactive message in said reactive message store only if a variable attribute of said reactive message indicates that said reactive message is to be stored in said reactive message store.

12. The asynchronous messaging system node of claim 10, in which said reactive message identifies a plurality of previously initiated messages and said action applies to each previously initiated method in said plurality, said processor being further configured to perform said action specified in said reactive message only after each previously initiated message identified by said reactive message has been received in said asynchronous messaging queue.

13. The asynchronous messaging system node of claim 10, in which said asynchronous messaging queue is a transmit queue such that said action is performed on the previously initiated message prior to transmission of the previously initiated message to a target queue in route to said intended recipient.

14. The asynchronous messaging system node of claim 10, in which said asynchronous messaging queue comprises a reactive agent to which all incoming messages are first directed to determine which messages are reactive messages and which are non-reactive messages.

15. The asynchronous messaging system node of claim 10, in which said asynchronous messaging queue comprises a receiving queue for receiving messages transmitted from a transmission queue associated with a second asynchronous messaging system node.

16. A computer program product for managing an asynchronous messaging queue, the computer program product comprising:
a non-transitory computer readable storage medium having computer readable program code embodied therewith, the computer readable program code comprising:
computer readable program code configured to receive a reactive message in said asynchronous messaging queue, said reactive message comprising an identification of a previously initiated message and an action to be performed on said previously initiated message;
computer readable program code configured to perform said action on said previously initiated message responsive to a determination that said previously initiated message has already been received in said asynchronous messaging queue prior to a GET call to the asynchronous messaging queue from an application program that is the intended recipient of the previously initiated message;
computer readable program code configured to store said reactive message in a reactive message store responsive to a determination that said previously initiated message has not already been received in said asynchronous messaging queue; and
computer readable program code configured to perform said action on a subsequent message received in said asynchronous message queue in response to a determination that said reactive message stored in said reactive message store identifies said subsequent message.

17. The method of claim 1, further comprising:
responsive to receiving a subsequent message in said asynchronous message queue, determining whether any reactive message stored in said reactive message store identifies that subsequent message.

* * * * *